(12) United States Patent
Ge et al.

(10) Patent No.: US 10,210,173 B2
(45) Date of Patent: Feb. 19, 2019

(54) FILE STORAGE PROCESSING IN HDFS

(71) Applicant: International Business Machines Corporation, Armonk, NY (US)

(72) Inventors: Yi Ge, Beijing (CN); Liang Liu, Beijing (CN); Junmei Qu, Beijing (CN); Wen Jun Yin, Beijing (CN); Wei Zhuang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 14/727,926

(22) Filed: Jun. 2, 2015

(65) Prior Publication Data
US 2015/0379024 A1 Dec. 31, 2015

(30) Foreign Application Priority Data
Jun. 27, 2014 (CN) .......................... 2014 1 0302839

(51) Int. Cl.
*G06F 17/30* (2006.01)

(52) U.S. Cl.
CPC .............................. *G06F 17/30194* (2013.01)

(58) Field of Classification Search
CPC .................... G06F 17/30194; G06F 17/30079
USPC ......................................................... 707/825
See application file for complete search history.

(56) References Cited

U.S. PATENT DOCUMENTS

| | | | | |
|---|---|---|---|---|
| 2012/0317155 | A1* | 12/2012 | Ogasawara | G06F 17/30589 707/812 |
| 2013/0124483 | A1 | 5/2013 | Furuhashi et al. | |
| 2013/0185337 | A1* | 7/2013 | Lipcon | G06F 17/30138 707/813 |
| 2013/0254246 | A1 | 9/2013 | Lipcon | |
| 2014/0095505 | A1 | 4/2014 | Blanchflower et al. | |
| 2014/0188825 | A1* | 7/2014 | Muthukkaruppan | G06F 17/30339 707/694 |
| 2015/0302075 | A1* | 10/2015 | Schechter | G06F 17/30144 707/641 |
| 2016/0267132 | A1* | 9/2016 | Castellanos | G06F 17/30132 |

FOREIGN PATENT DOCUMENTS

| | | |
|---|---|---|
| CN | 102902716 A | 1/2013 |
| CN | 103246700 A | 8/2013 |
| CN | 103595791 A | 2/2014 |

(Continued)

OTHER PUBLICATIONS

Paranawithana, "Small File problem in Hadoop," http://amilaparanawithana.blogspot.in/2012/06/small-file-problem-in-ha . . . , accessed on Apr. 21, 2014, pp. 1-8.

(Continued)

*Primary Examiner* — James Trujillo
*Assistant Examiner* — Jessica N Le
(74) *Attorney, Agent, or Firm* — Teddi E. Maranzano (57) ABSTRACT

A method and system for processing file storage is provided. The method includes receiving a file storage request and determining a file size of a file which is requested to be stored. In response to determining that the file is a small file, a request is sent to an HBase to store the file into the HBase. In response to determining that the file is a large file, a request is sent to a HDFS to store the file into the HDFS. Information associated with the file is stored in a record.

3 Claims, 5 Drawing Sheets

(56) References Cited

FOREIGN PATENT DOCUMENTS

| CN | 103647850 A | 3/2014 |
|---|---|---|
| CN | 103838830 A | 6/2014 |
| CN | 105205082 A | 12/2015 |

OTHER PUBLICATIONS

"Hadoop Batch File Processing with Hive—Part #2," The Data Stack, https://communities.intel.com/community/itpeernetwork/datastack/blog/20 . . . , accessed on Apr. 21, 2014, pp. 1-3.
Dong et al., "An optimized approach for storing and accessing small files on cloud storage," Journal of Network and Computer Applications 35, 2012, pp. 1847-1862.
"Revolution Analytics White Paper: Advanced 'Big Data' Analytics with R and Hadoop," Revolution Analytics, 2011, pp. 1-7.
"MapFile," MapServer, http://www.mapserver.org/mapfile/, accessed on May 27, 2015, pp. 1-3.
"Sequence File," Hadoop Wiki, http://wiki.apache.org/hadoop/SequenceFile, accessed on May 27, 2015, pp. 1-3.
"Hadoop Archives Guide," Hadoop, http://hadoop.apache.org/docs/r1.2.1/hadoop_archives.html, accessed on May 27, 2015, pp. 1-3.

\* cited by examiner

FILE STORAGE PROCESSING IN HDFS

BACKGROUND

The present invention relates to file storage, and more specifically, to a method and system for processing file storage in HDFS.

Hadoop Distributed File System (HDFS) is a widely-used distributed file system that is designed to be highly fault tolerant, be deployed on inexpensive hardware, store large scale data sets, and stream those data sets at high bandwidth to user applications.

A HDFS cluster includes a NameNode and a configurable number of DataNodes. The NameNode is a central server responsible for managing the NameSpace, which is a hierarchy of files and directories that clients access. A DataNode cluster is a server that stores and manages which is responsible for managing storage of the node where it resides.

Within HDFS, one file is split into one or more blocks, which are stored in a set of DataNodes. The NameNode is used to manipulate file or directory operation in a file namespace, such as open, close, rename, etc, and also to determine mapping between a block and a DataNode. The DataNode is responsible for read and write requests from clients of the file system, creation and deletion of an executable block, block copy instruction from the NameNode, and the like.

In HDFS, block, file or directory are all stored in memory in form of an object. Each object takes about 150 bytes. If there are 10,000,000 small files and each file occupies one block, then approximately a 2 Gigabytes (GB) space is required by the NameNode. If 100 million files are stored, then a 20 GB space is required by the NameNode. Thus, memory capacity of the NameNode will seriously restrict extension of the cluster.

Secondly, HDFS is initially developed for streamed access to large files. Speed of processing a large number of small files is much lower than that of processing a large file with equal size. If a large number of small files are accessed, there is a need to constantly jump from one DataNode to another DataNode, and speed of accessing a large number of small files is much lower than that of accessing several large files, thereby seriously affecting performance. Moreover, starting a task consumes a large amount of time, as does terminating the task, and switching between tasks. Therefore, it is desirable to provide a solution capable of enhancing capability of a HDFS to process small files.

SUMMARY

According to one aspect of the present invention, there is provided a method for processing file storage. The method provides receiving a file storage request and determining file size of a file which is requested to be stored. In response to determining that the file is a small file, sending the file storage request to an HBase to store the file into the HBase. In response to determining that the file is a large file, sending the file storage request to a HDFS so as to store the file into the HDFS, and saving information associated with the stored HDFS file in a record.

According to another aspect of the present invention, there is provided a system for processing file storage. The system provides a request receiving module configured to receive a file storage request and a managing module configured to determine file size of a file to be stored. The managing module is further configured to send the file storage request to an HBase to store the file into the HBase in response to determining that the file is a small file. In response to determining that the file is a large file, the file storage request is sent to a HDFS s to store the file into the HDFS, and save information associated with the stored HDFS file in a record.

A computer program product for processing file storage is provided and includes a computer readable storage device readable by a processing circuit and storing instructions for execution by the processing circuit for performing a method. The method provides receiving a file storage request and determining file size of a file to be stored. In response to determining that the file is a small file, sending the file storage request to a Hadoop database (HBase) to store the file into the HBase. In response to determining that the file is a large file, sending the file storage request to a Hadoop Distributed File System (HDFS) to store the file into the HDFS, and saving information associated with the stored HDFS file in a record.

With the method and system of embodiments of the present invention, capability of HDFS in processing small files is significantly enhanced.

BRIEF DESCRIPTION OF THE SEVERAL VIEWS OF THE DRAWINGS

Through the more detailed description of illustrative embodiments of the present disclosure in the accompanying drawings, the above and other objects, features and advantages of the present disclosure will become more apparent, wherein the same reference generally refers to the same components in illustrative embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
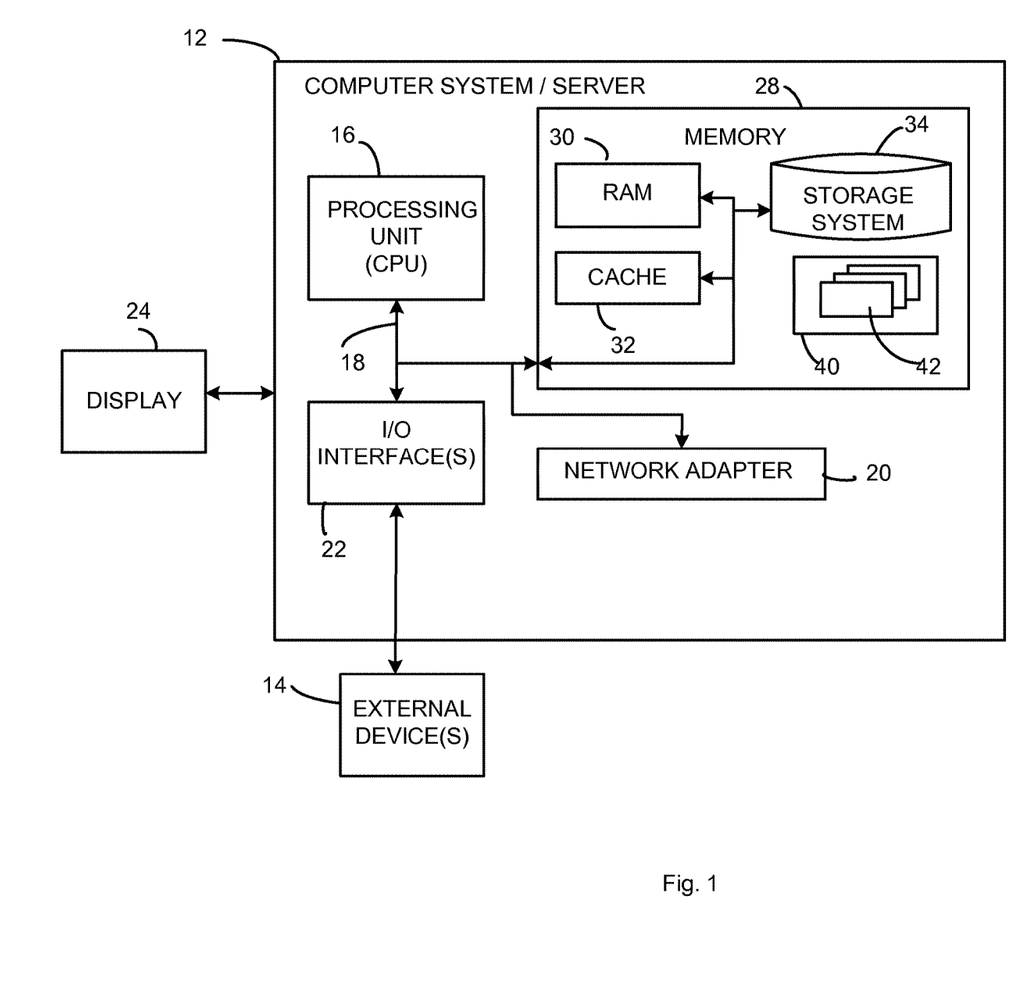
FIG. 1 shows a block diagram of an exemplary computer system/server 12 which is applicable to implement the embodiments of the present invention.

Referring now to FIG. 1, a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 includes, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media includes any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 further includes other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 includes at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, includes an implementation of a networking environment. Program modules 42 generally carry out the functions and/or methodologies of embodiments of the invention as described herein.

Computer system/server 12 also communicates with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

According to statistics, it is found that in the network, the number of files is inversely proportional to the size of the files, that is, the larger the file size, the smaller the number of the files. Therefore, as to the above discussed problem faced by HDFS in processing small files, a method and system is proposed that is based on HBase and HDFS to enhance performance of small file storage, wherein the HBase, i.e. the Hadoop database, is a high reliability, high performance, column oriented and scalable distributed storage system. In the solution according to embodiments of the present invention, files whose number is relatively small but whose size is relatively large are stored in HDFS, so as to fully leverage advantage of HDFS in processing large file, while a large number of small files are stored in HBase, thereby effectively solving the problem faced by HDFS in processing a large number of small files.

Various embodiments of the present invention will be described below with reference to accompany drawings.

Figure 2:
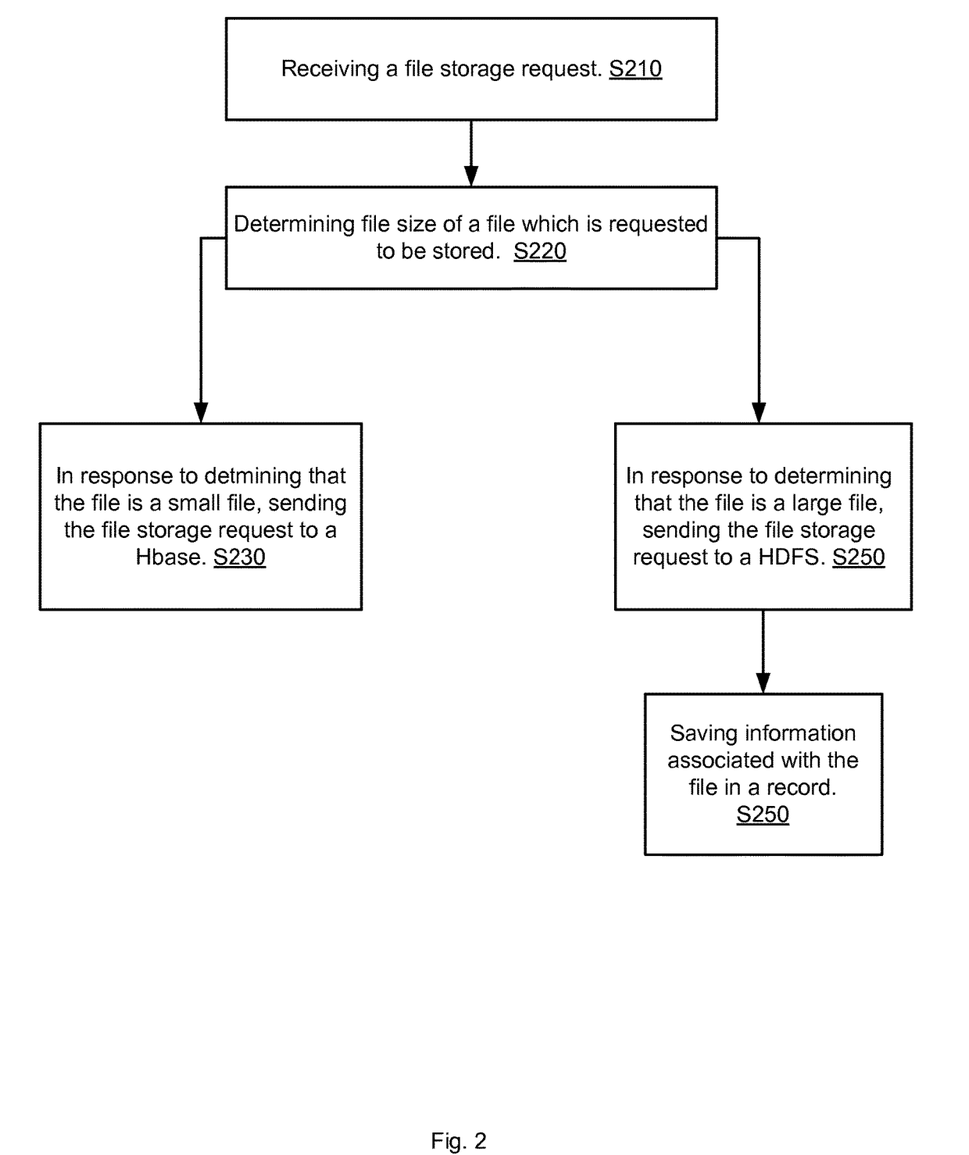
FIG. 2 shows a flowchart of a method for processing file storage according to one embodiment of the present invention.

FIG. 2 depicts a flowchart of a method for processing file storage according to one embodiment of the present invention.

At step S210, receiving a file storage request.

At step S220, determining file size of a file which is requested to be stored.

According to one embodiment of the present invention, after the file storage request is received, it is determined whether the file is a large file or a small file by comparing file size of the received file with a threshold. It should be noted that, both large file and small file here are relative. The threshold is set to an appropriate value by those skilled in the art according to the requirements of the actual situation.

At step S230, in response to determining that the file is a small file, sending the file storage request to an HBase so as to store the file into the HBase.

At step S240, in response to determining that the file is a large file, sending the file storage request to a HDFS so as to store the file into the HDFS, and at step S250, saving information associated with the file in a record. According to one embodiment of the present invention, file name of the file is recorded in a list for future reference. Of course, any other information capable of identifying the file and associated with the file is also recorded.

Thus, by only storing files with large file sizes relative to the threshold in the HDFS, problem encountered by HDFS in accessing a large number of small files can be effectively avoided. Furthermore, since the number of large files is generally small, by recording associated information of the large files, fast lookup can be performed easily when the files are read in the future.

Figure 3:
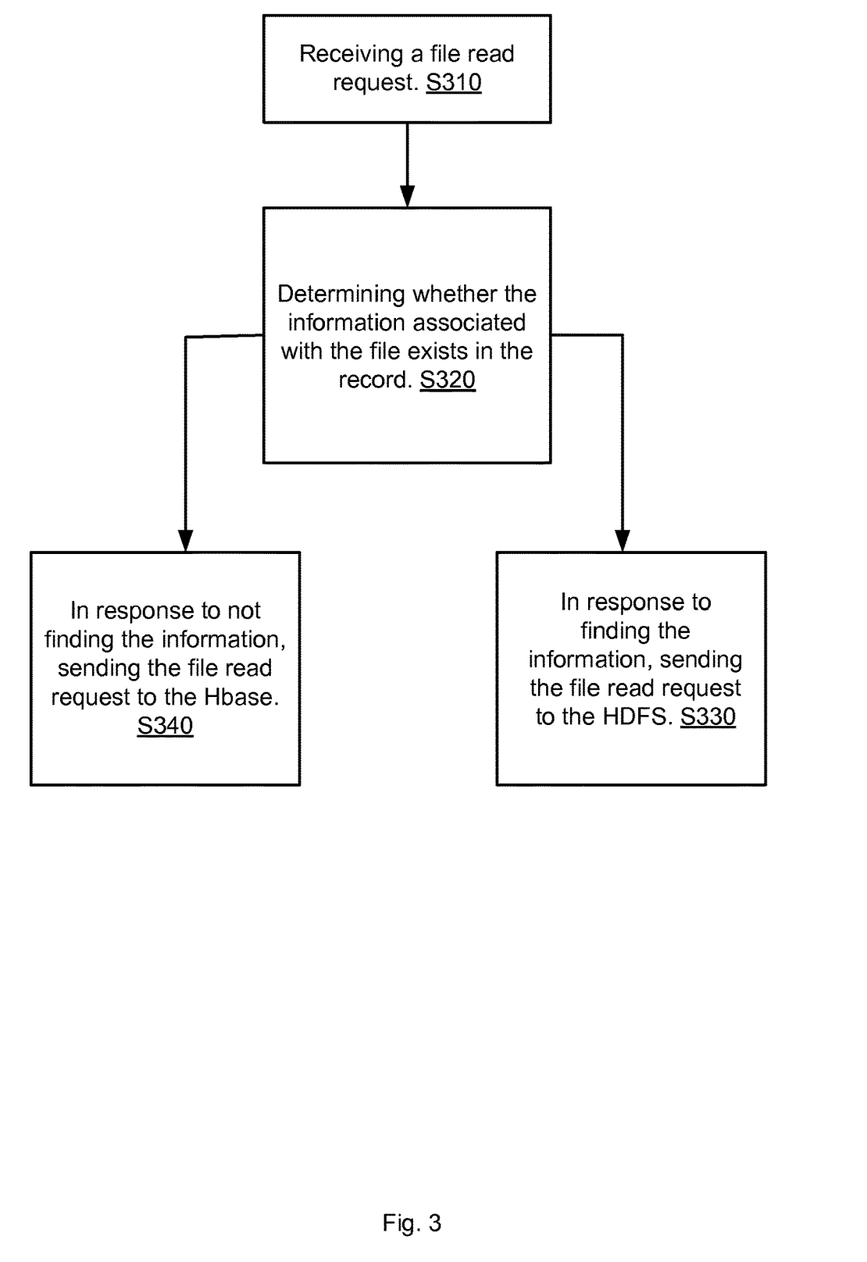
FIG. 3 shows a flowchart of a process for reading a file stored in accordance with the method shown in FIG. 2 according to one embodiment of the present invention.

FIG. 3 depicts a flowchart of a process for reading a file stored in accordance with the method shown in FIG. 2.

At step S310, receiving a file read request.

At step S320, determining whether the information associated with the file exists in the record. For example, according to one embodiment of the present invention, lookup in the record may be performed by using file name of the file.

At step S330, in response to finding the information, sending the file read request to the HDFS to read the file. In processing file storage as shown in FIG. 2, associated information of all files stored in the HDFS is stored in the record. Therefore, if the information associated with the file is found in the record, it means that the file is stored in the HDFS, thus the file read request is sent to the HDFS to read the file.

At step S340, in response to not finding the information, sending the file read request to the HBase to read the file. If the information associated with the file is not found in the record, it means that the file is stored in the HBase. At this point, the file will be read from the HBase.

In this way, pressure on NameNode of the HDFS can be relieved by looking up the record which records information about large files, thereby effectively enhancing file query performance.

The HDFS is designed for accessing a large file in form of stream, it supports appending to a file, i.e., adding content at end of the file, and thus file size in the HDFS varies. The HBase supports operations such as modification, deletion, update of a record, appending to a record, etc, and thus file size in the HBase also varies as operations are performed.

According to one embodiment of the present invention, to further optimize file storage and reading, a file is dynamically migrated between the HDFS and the HBase according to change in file size. According to one embodiment of the present invention, change in file size of a file in the HBase is monitored. In response to file size of the file exceeding a first threshold, the file is migrated from the HBase to the HDFS, and information associated with the file is saved in a record.

According to another embodiment of the present invention, change in file size of a file in the HDFS is monitored, and in response to the file size being lower than a second threshold, the file is migrated from the HDFS to the HBase, and information associated with the file is deleted from the record. Wherein, the first threshold and the second threshold may be same or different.

According to one embodiment of the present invention, efficiency in file access is further improved by optimizing table structure in the HBase.

Figure 4:
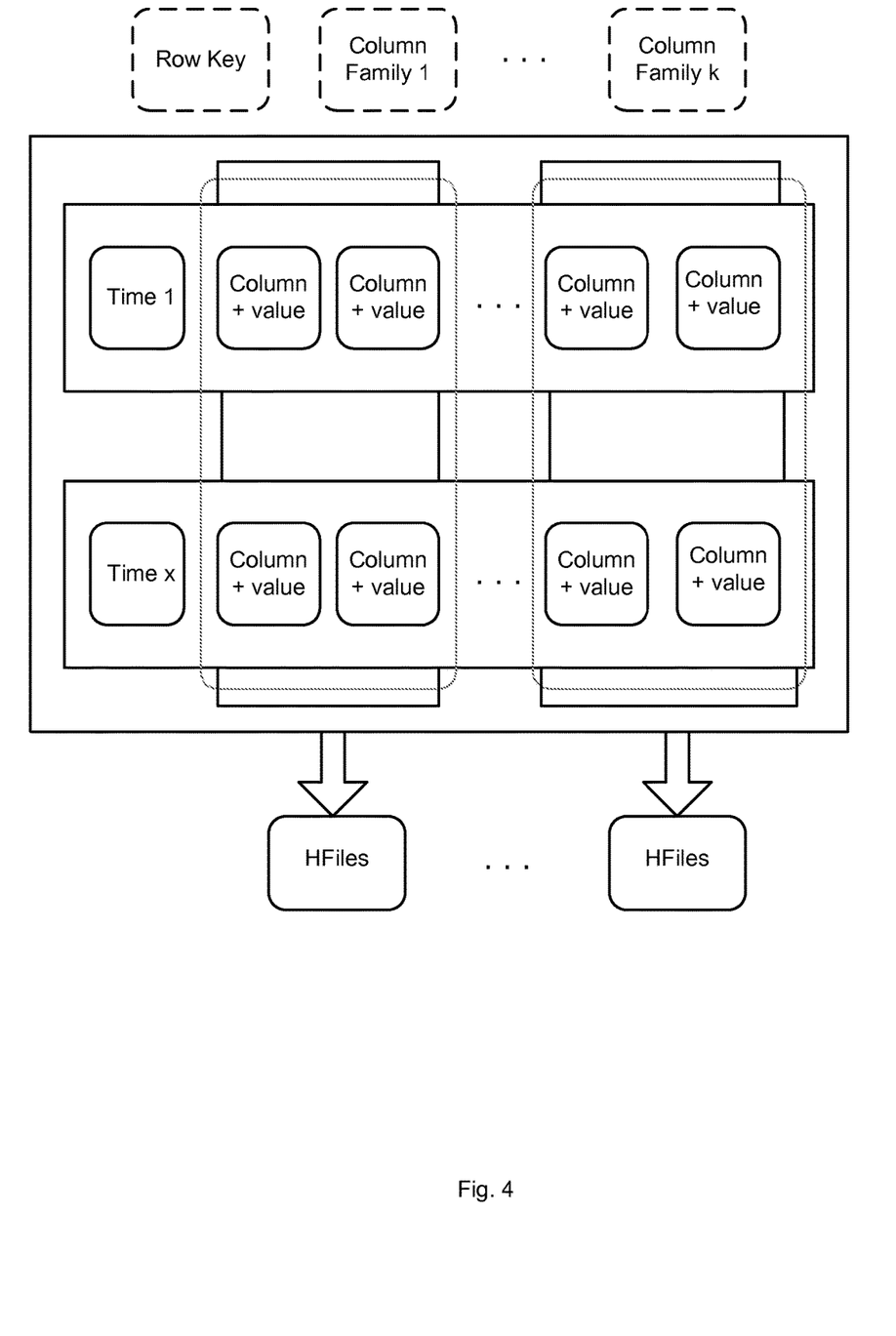
FIG. 4 shows a diagram of structure of an HBase according to one embodiment of the present invention.

FIG. 4 depicts a diagram of structure of HBase according to one embodiment of the present invention. As shown in FIG. 4, the HBase performs physical storage in form of HFile. An HFile is the smallest unit of storage, and is a binary format file of the Hadoop. Wherein, one Column Family (CF) may have multiple HFiles, but one HFile cannot store data from multiple CFs.

Size of an HFile is configured and set as needed. For example, if a default size of an HFile is 64 Kilobytes (KB), when a file is very large, for example, 32 Megabytes (MB), then 512 HFiles are needed and 512 HFiles are read when reading one file. If the HFile is set to 32 MB, a file of 64 KB merely occupies 1/512 thereof, and a file of 32 MB is loaded when reading a file of 64 KB. In another example, if 1000 files (64 MB) each of which is 64 KB is loaded and they are distributed in different HFiles, then actually 32 GB of data is loaded. Therefore, if size of an HFile could be set appropriately so as to match with size of the stored file, efficiency in file reading can be improved.

As described above, in a network, number of files is inversely proportional to file size, the larger the file size, the smaller the number of the files. Based on this feature, according to one embodiment of the present invention, size of HFile corresponding to column families in the HBase is set to respectively match with file size of a file that could be stored in the HFile.

Taking the HBase shown in FIG. 4 for example. A plurality of column families CF1 through CFk are divided in the HBase, and each column family stores a file whose size is within a certain range. For example:

A file with size <64 KB is stored in a first column family.
A file with size >=64 KB and <128 KB is stored in a second column family.
A file with size >=128 KB and <256 KB is stored in a third column family.
A file with size >=$64*2^{k-1}$ KB and <$64*2^k$ KB is stored in the $k^{th}$ column family.

Furthermore, the size of an HFile corresponding to each column family is set to match with size of the file stored in that column family. For example:

Size of an HFile of the first column family is 64 KB.
Size of an HFile of the second column family is 128 KB.
Size of an HFile of the third column family is 256 KB.
Size of an HFile of the $k^{th}$ column family is $64*2^k$ KB.

In this case, since the larger the file size, the smaller the number of the files, although file size in the first column family is small, number of the files is large, while in a column family which stores larger file, although size of the stored file is larger, number of the files is smaller. Thus, as a whole, storage physically occupied by each column family is balanced. Meanwhile, a query to each file is accomplished within one HFile, thereby improving query performance of the HBase.

It should be noted that, although in the above example, size of the HFile is set to be the same as the maximum value of the size of a file that could be stored therein, those skilled in the art will appreciate that, the size of the HFile and the size of a file that could be stored therein need not to be the same. For example, the size of the HFile may also be set as a divisor, a multiple of the maximum value of size of a file that could be stored, or be set as any other appropriate value.

According to one embodiment of the present invention, the change in file size of a file in a column family of the HBase is monitored, and in response to the file size of the file in the column family not matching the block size of the column family, the file is migrated to a column family with a block size that matches the file size.

For example, when the file size of a file in the HBase increases due to operation such as modification or appending, and the file size no longer conforms to storage rule of the current column family, migration of the file to a column family with larger HFile is performed. When the file size of a file in the HBase decreases due to operation such as deletion, and the file size no longer conforms to storage rule of the current column family, migration of the file to a column family with smaller HFile is performed.

Thus, the HBase can effectively organize scattered data, with the result that the HDFS mainly processes large files. Such hybrid self-adaptive data migration mechanism can achieve balance between the HBase and the HDFS.

Those skilled in the art will appreciate that the above method is implemented either in software or in hardware or in a combination thereof. Furthermore, those skilled in the art will appreciate that, by implementing various steps of the above method in software, hardware or a combination thereof, a system for processing file storage is provided. Although hardware structure of that system is the same as that of a generic processing device, that system shows features distinguished from the generic processing device due to functions of the software included therein, thereby forming an apparatus of embodiments of the present invention.

Figure 5:
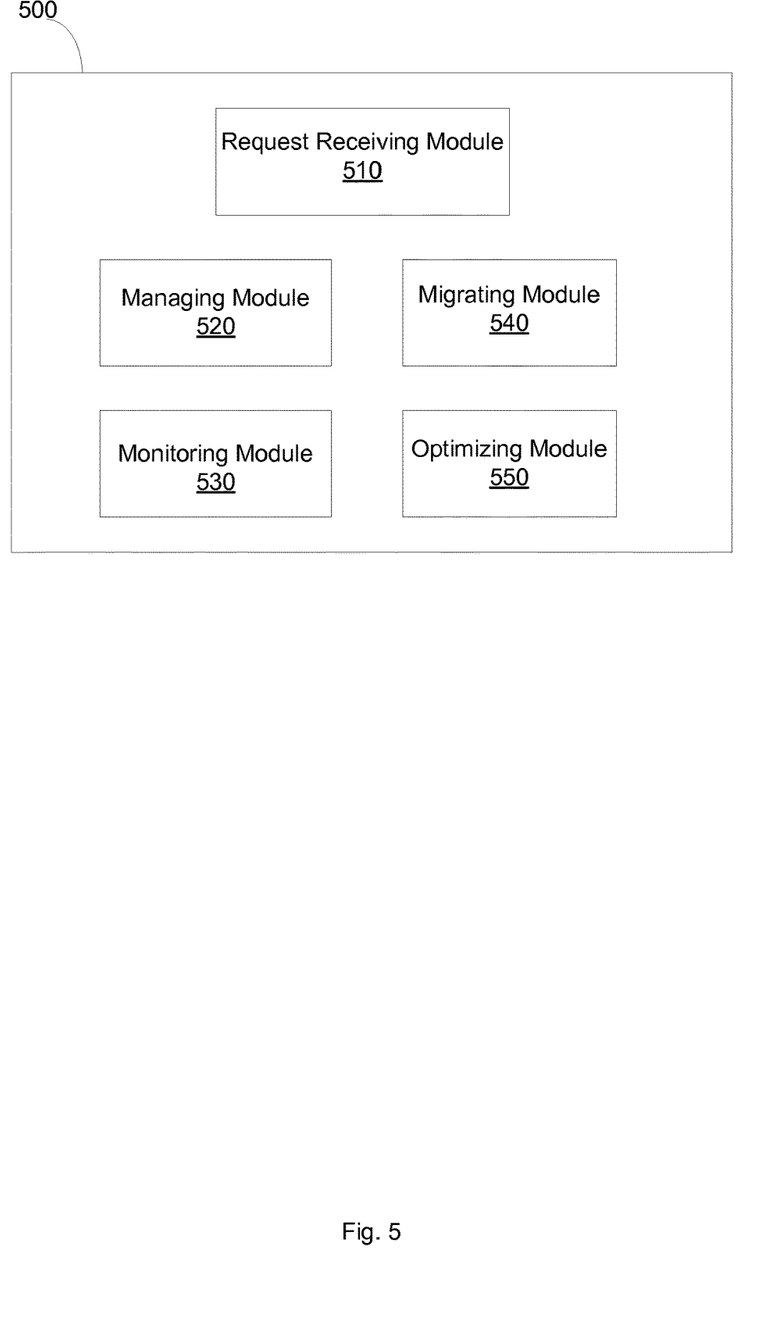
FIG. 5 shows a block diagram of a system for processing file storage according to one embodiment of the present invention.

FIG. 5 depicts a block diagram of a system for processing file storage according to one embodiment of the present invention. The system 500 includes a request receiving module 510 and a managing module 520. According to one embodiment of the present invention, in process of performing file storage, the request receiving module 510 is configured to receive a file storage request, the managing module 520 is configured to determine file size of a file which is requested to be stored, and the managing module 520 is further configured to: in response to determining that the file is a small file, send the file storage request to a Hadoop database (HBase) so as to store the file into the HBase; and in response to determining that the file is a large file, send the file storage request to a Hadoop Distributed File System (HDFS) so as to store the file into the HDFS, and save information associated with the file in a record.

According to one embodiment of the present invention, in process of performing file storage, the request receiving module 510 is configured to receive a file read request, and the managing module 520 is further configured to determine whether the information associated with the file exists in the record. In response to finding the information, the file read request is sent to the HDFS to read the file. In response to not finding the information, the file read request is sent to the HBase to read the file.

According to one embodiment of the present invention, the system 500 further includes a monitoring module 530 configured to monitor change in file size of a file in the HBase. A migrating module 540 is configured to, in response to the file size of the file exceeding a first threshold, migrate the file from the HBase to the HDFS. The managing module 520 saves information associated with the file in the record.

According to one embodiment of the present invention, the monitoring module 530 is further configured to monitor changes in the file size of a file in the HDFS. The migrating module 540 is configured to, in response to the file size being lower than a second threshold, migrate the file from the HDFS to the HBase. The managing module 520 deletes information associated with the file from the record.

According to one embodiment of the present invention, the size of the HFile of column families in the HBase may be set to respectively match with the file size of a file that could be stored in the HFile.

According to one embodiment of the present invention, the monitoring module 530 may also be configured to monitor change in file size of a file in a column family of the HBase. The system 500 further provides an optimizing module 550 configured to, in response to file size of the file in the column family not matching with block size of the column family, migrate the file to a column family whose size of HFile matches with file size thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing file storage, comprising:
    monitoring change in size of the file stored in the HBase;
    when the size of the file in a column family differs from a configurable block size of the column family, migrating the file to another column family having a same HFile size as the file;
    when the size of the file exceeds the configurable threshold, dynamically migrating the file from the HBase to the HDFS, and adding the information associated with the migrated file to the record;
    monitoring change in the size of the file stored in the HDFS;
    when the size of the file is below the configurable threshold;
    dynamically migrating the file from the HDFS to the HBase, and deleting the information associated with the migrated file from the record;
    receiving a file access request;
    in response to the file access request being a file storage request:
        comparing a size of a file of the file storage request to a configurable threshold;
        sending the file storage request to a Hadoop database (HBase) to store the file into the HBase based on the size of the file being smaller than the configurable threshold and wherein the file is stored in the HBase based on the size of the file matching a configurable HFile size of column families in the HBase;
        sending the file storage request to a Hadoop Distributed File System (HDFS) to store the file into the HDFS, based on the size of the file exceeding the configurable threshold, and
        saving information associated with the stored HDFS file in a record comprising information associated with files stored in the HDFS;
    in response to the file access request being a file read request:
        querying the record associated with files stored in the HDFS for a file of the file storage request:
            sending the file read request to the HDFS based on the requested file being listed in the record; and
            sending the file read request to the HBase based on the requested file being absent from the record.

2. A system for processing file storage, the system comprising a computer having one or more processors, one or more computer-readable tangible storage devices, and a plurality of program instructions stored on at least one of the one or more tangible storage devices for execution by at least one of the one or more processors, the plurality of program instructions executing the method comprising:
    monitoring change in the size of the file stored in the HBase;
    when the size of the file in a column family differs from a configurable block size of the column family, migrating the file to another column family having a same HFile size as the file;
    when the size of the file exceeds the configurable threshold, dynamically migrating the file from the HBase to the HDFS, and updating the record with the information associated with the migrated file;
    monitoring change in the size of the file stored in the HDFS;
    when the size of the file is below the configurable threshold:
        dynamically migrating the file from the HDFS to the HBase;
        deleting the information associated with the migrated file from the record;
    in response to receiving a file access request that is a file storage request:
        comparing a size of a file of the file storage request to a configurable threshold;
        sending the file storage request to a Hadoop database (HBase) to store the file into the HBase based on the size of the file being smaller than the configurable threshold and wherein the file is stored in the HBase based on the size of the file matching a configurable HFile size of column families in the HBase;

sending the file storage request to a Hadoop Distributed File System (HDFS) to store the file into the HDFS, based on the size of the file exceeding the configurable threshold;

saving information associated with the stored HDFS file in a record comprising information associated with files stored in the HDFS;

in response to receiving the file access request that is a file read request:

querying the record associated with files stored in the HDFS for a file of the file storage request;

sending the file read request to the HDFS based on the requested file being listed in the record; and sending the file read request to the HBase based on the requested file being absent from the record.

3. A computer program product for processing file storage, comprising a tangible computer readable storage device readable by a processing circuit and storing instructions for execution by the processing circuit for performing a method comprising:

monitoring change in size of the file stored in the HBase;

when the size of the file in a column family differs from a configurable block size of the column family, migrating the file to another column family having a same HFile size as the file:

when the size of the file exceeds the configurable threshold, dynamically migrating the file from the HBase to the HDFS, and adding the information associated with the migrated file to the record;

monitoring change in the size of the file stored in the HDFS;

when the size of the file is below the configurable threshold; dynamically migrating the file from the HDFS to the HBase, and deleting the information associated with the migrated file from the record;

in response to receiving a file access request that is a file storage request:

comparing a size of a file of the file storage request to a configurable threshold;

sending the file storage request to a Hadoop database (HBase) to store the file into the HBase based on the size of the file being smaller than the configurable threshold and wherein the file is stored in the HBase based on the size of the file matching a configurable HFile size of column families in the HBase;

sending the file storage request to a Hadoop Distributed File System (HDFS) to store the file into the HDFS, based on the size of the file exceeding the configurable threshold, and saving information associated with the stored HDFS file in a record comprising information associated with files stored in the HDFS;

in response to receiving the file access request that is a file read request:

querying the record associated with files stored in the HDFS for a file of the file storage request:

sending the file read request to the HDFS based on the requested file being listed in the record; and sending the file read request to the HBase based on the requested file being absent from the record.

\* \* \* \* \*